United States Patent
Loew et al.

(10) Patent No.: US 7,508,435 B2
(45) Date of Patent: Mar. 24, 2009

(54) METHOD FOR THE CORRECTION OF VIDEO SIGNALS

(75) Inventors: Andreas Loew, Gross-Gerau (DE); Manfred Dworatzek, Ober-Ramstadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 1125 days.

(21) Appl. No.: 10/659,686

(22) Filed: Sep. 9, 2003

(65) Prior Publication Data

US 2004/0119857 A1 Jun. 24, 2004

(30) Foreign Application Priority Data

Sep. 12, 2002 (DE) ................. 102 42 517

(51) Int. Cl.
H04N 3/14 (2006.01)
H04N 5/335 (2006.01)

(52) U.S. Cl. .................. 348/316; 348/324

(58) Field of Classification Search ............. 348/316, 348/324

See application file for complete search history.

(56) References Cited

U.S. PATENT DOCUMENTS

| | | | |
|---|---|---|---|
| 4,376,289 A | | 3/1983 | Reitmeier et al. |
| 4,463,380 A | * | 7/1984 | Hooks, Jr. .................. 348/580 |
| 5,532,917 A | | 7/1996 | Hung ........................ 363/67 |
| 5,801,850 A | * | 9/1998 | Maki et al. .................. 358/483 |
| 5,910,891 A | | 6/1999 | Jo ............................ 363/89 |
| 6,032,864 A | | 3/2000 | Hamasuna ............. 235/462.25 |
| 6,078,685 A | * | 6/2000 | Kawai et al. ................. 382/167 |
| 6,088,242 A | | 7/2000 | Koegel et al. ................ 363/21 |
| 6,781,628 B1 | * | 8/2004 | Yoshihara et al. ............ 348/316 |
| 6,791,615 B1 | * | 9/2004 | Shiomi et al. ................ 348/323 |
| 6,924,840 B1 | * | 8/2005 | Furuhata .................... 348/264 |
| 2005/0276515 A1 | * | 12/2005 | Shekter ...................... 382/286 |

FOREIGN PATENT DOCUMENTS

| | | |
|---|---|---|
| EP | 0913915 | 5/1999 |
| EP | 0987814 | 3/2000 |
| JP | 03-155279 | 7/1991 |
| JP | 05-227429 | 9/1993 |
| JP | 2002027324 | 1/2002 |

OTHER PUBLICATIONS

435107 "Design for Redundant Power Supply For Server Systems", 1242/Research Disclosure—Jul. 2000, XP-000991692.

"Characteristics of a Parallel-Module High Power-Factor AC-to-DC Converter System with Current-Balancing Controllers", T. Kohama et al., Department of Electronics, Kyushu University, Fukuoka, Japan, 0-7803-2750-0/95, 1995 IEEE, pp. 791-795.

* cited by examiner

*Primary Examiner*—Sinh N Tran
*Assistant Examiner*—Hung H Lam
(74) *Attorney, Agent, or Firm*—Robert D. Shedd; Paul P. Kiel; Guy H. Eriksen

(57) ABSTRACT

The invention relates to a method for the correction of video signals which are produced by pixel-by-pixel reading of picture cells from an optoelectronic sensor via two or more channels which have different transmission characteristics. In this case, the video signal is supplied to a processing circuit and is converted to digital pixel values. Estimated values for pixel values of another transmission channel are calculated from the digital pixel values of one transmission channel, and the estimated values and pixel values of one transmission channel are used to derive correction values, which correct differences between the estimated values and the pixel values of the relevant transmission channel, if necessary.

12 Claims, 2 Drawing Sheets

METHOD FOR THE CORRECTION OF VIDEO SIGNALS

FIELD OF THE INVENTION

The invention relates to a method for the correction of video signals.

Line-array optoelectronic transducers such as CCD line sensors are used for scanning films and other pictures. Pixels from the line-array optoelectronic transducer are in this case frequently read over two or more channels. By way of example, the pixels from the optoelectronic transducer can be read over four channels, with one line of the optoelectronic transducer being read in different directions starting from a central start point, and with successive pixels being read to different channels, so that a total of four channels exist.

These channels, which essentially comprise the pixels, a register and an amplifier in each case, are subject to manufacturing tolerances which affect the linearity, the gain and any offset (black value). This means that the value of every second pixel may be different from the values of the adjacent pixels even if the picture content has no changes.

Errors can occur in particular as a result of the reading of successive pixels in two different channels in each case, and from the start point of the optoelectronic transducer, from which the sensor, which is in the form of a row, is read to the right and to the left.

SUMMARY OF THE INVENTION

During the scanning of films and other pictures, these errors may become apparent as fine strips running vertically.

The present invention is based on the problem of providing a method for the correction of video signals which reduces or eliminates errors of this type.

A correction of video signals exhibiting errors of this type is achieved by the method according to the invention by means of the features of Claim 1.

The errors mentioned in the introduction can be automatically corrected by the method according to the invention, so that such stripe-like errors are no longer discernible. A preferred field of application at the present time is the processing of video signals read from linear-array sensors via two channels. However, other applications are also possible, for example those with more than two channels. Following analogue/digital conversion, the video signals are in the form of digital picture signals. In the present connection, the term "value" is tantamount to "sample".

A first step is based on determining an error caused by the reading of successive pixels in two different channels in each case. In this case, provision is made for estimated values for the pixel values of a second channel to be formed by means of interpolation from the pixel values transmitted via a first channel, and for correction values for the pixel values of the second channel to be derived from differences between the estimated values and the actual pixel values of the second channel.

The method according to the invention preferably provides for the correction values to be formed only from differences which are less than a predetermined value. Provision is in this case made for an associated pixel value to be defined relating to the difference. A characteristic is determined from this over the entire profile of the pixel values, from which an addition value and a multiplication factor are derived, as a function of the pixel values, depending on the level. The profile of the pixel values may be linear or may be in discrete form, for example into 100 zones. This prevents structures that are actually present in the picture from influencing the calculation of the correction values.

In principle, with the method according to the invention, it is possible to correct the signals of the other channel and thus to match them to the signals of the first channel. More precise correction results, however, with the aid of a development of the method according to the invention in that furthermore, further estimated values are formed by interpolation of pixel values transmitted by means of the second channel, in that further differences are formed from the further estimated values and the pixel values of the first channel, in that an average value is in each case formed from the differences and the further differences, and in that the correction value is derived from the average values.

This development may preferably be configured in such a way that the differences and the further differences are in each case subtracted from one another, and in that the respective average value of the differences is only used for correction if the value produced by subtraction of the difference and the further difference is less than a further predetermined value. As a result, estimated values are also precluded from use for forming the correction values if the two estimates lead to significantly different results, which may possibly be the case with specific picture structures.

A correction of the video signals whilst taking account of amplitude-dependent errors is preferably possible in that the differences and the further differences, for the purpose of forming the correction values, are averaged separately according to the magnitude of the pixel values, in that the correction values are written to a memory, and in that the correction values are read from the memory depending on the respective magnitude of the pixel values and are added to the video signals of the first and/or the other channel.

In this development of the method according to the invention, it may be provided that the averaging is in each case effected separately according to magnitude ranges of the pixel values, and in that correction values are obtained for the individual amplitude values by interpolation and low-pass filtering. During the interpolation and low-pass filtering it is possible to employ functions which take account of the differences that occur between the two channels, and prevent differences that do not occur, such as step junction changes, for example, in the transfer characteristics during the formation of the correction values.

In one preferred procedure, the frequency of the time profile of the pixel values is determined, as is referred to for short in the following text as the "signal frequency". When calculating the correction values, the only pixel values which are taken into account are those which lead to a signal frequency which is below a specific cut-off frequency since, otherwise, errors occur which lead to unsuitable correction values. This development goes beyond the already mentioned investigation of the magnitude of the pixel values, since the calculation of the correction values also rejects pixel values which remain below the stated limit values. The cut-off frequency may depend on the limit values. In one simple case, the cut-off frequency may be chosen to satisfy the Nyquist criterion.

It is also possible to provide for a weighting factor to be determined from how well the test criteria are complied with, with this weighting factor being used to determine the extent to which a pixel value is included in the subsequent calculation of the correction values. The weighting factor represents a measure of the usefulness of a pixel value.

BRIEF DESCRIPTION OF THE DRAWINGS

An exemplary embodiment of the invention is illustrated in the drawing on the basis of several figures and explained in more detail in the description below. In the figures, FIG. 1 schematically shows an optoelectronic linear-array sensor.

DETAILED DESCRIPTION OF AN EXEMPLARY EMBODIMENT

Although the exemplary embodiment and parts thereof are illustrated as a block diagram, this does not mean that the arrangement according to the invention is restricted to a realization with the aid of individual circuits corresponding to the blocks. Rather, the arrangement according to the invention can be realized particularly advantageously with the aid of large scale integrated circuits. In this case, it is possible to use digital signal processors which, given suitable programming, carry out the processing step illustrated in the block diagrams.

Figure 1:
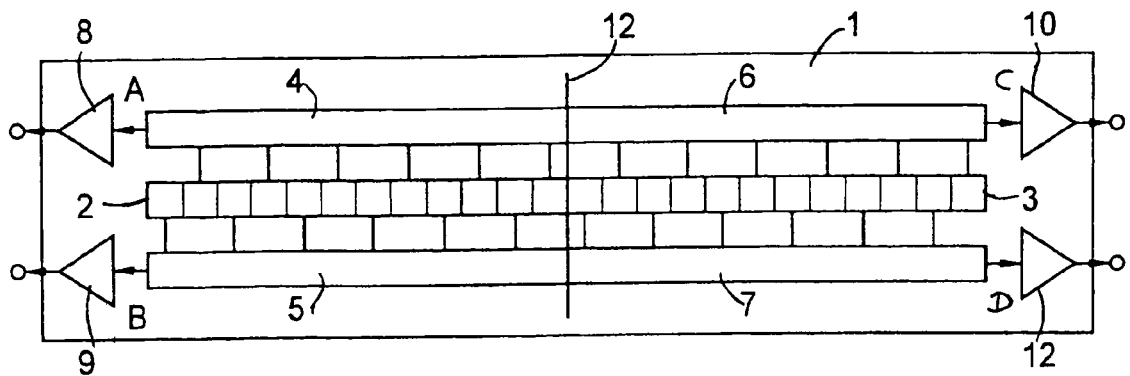

FIG. 1 shows, in highly schematic form, a linear optoelectronic transducer of the kind used in film scanners, in which a line of optical sensors is composed of two segments 2, 3. The charges respectively corresponding to the brightness of a pixel are transferred in parallel from the individual picture cells of the sensor into registers 4, 5, 6, 7 and are read serially from the latter. In this case, one of the registers 4 and 5, and 6 and 7, respectively, is used pixel by pixel in multiplex.

Figure 3:
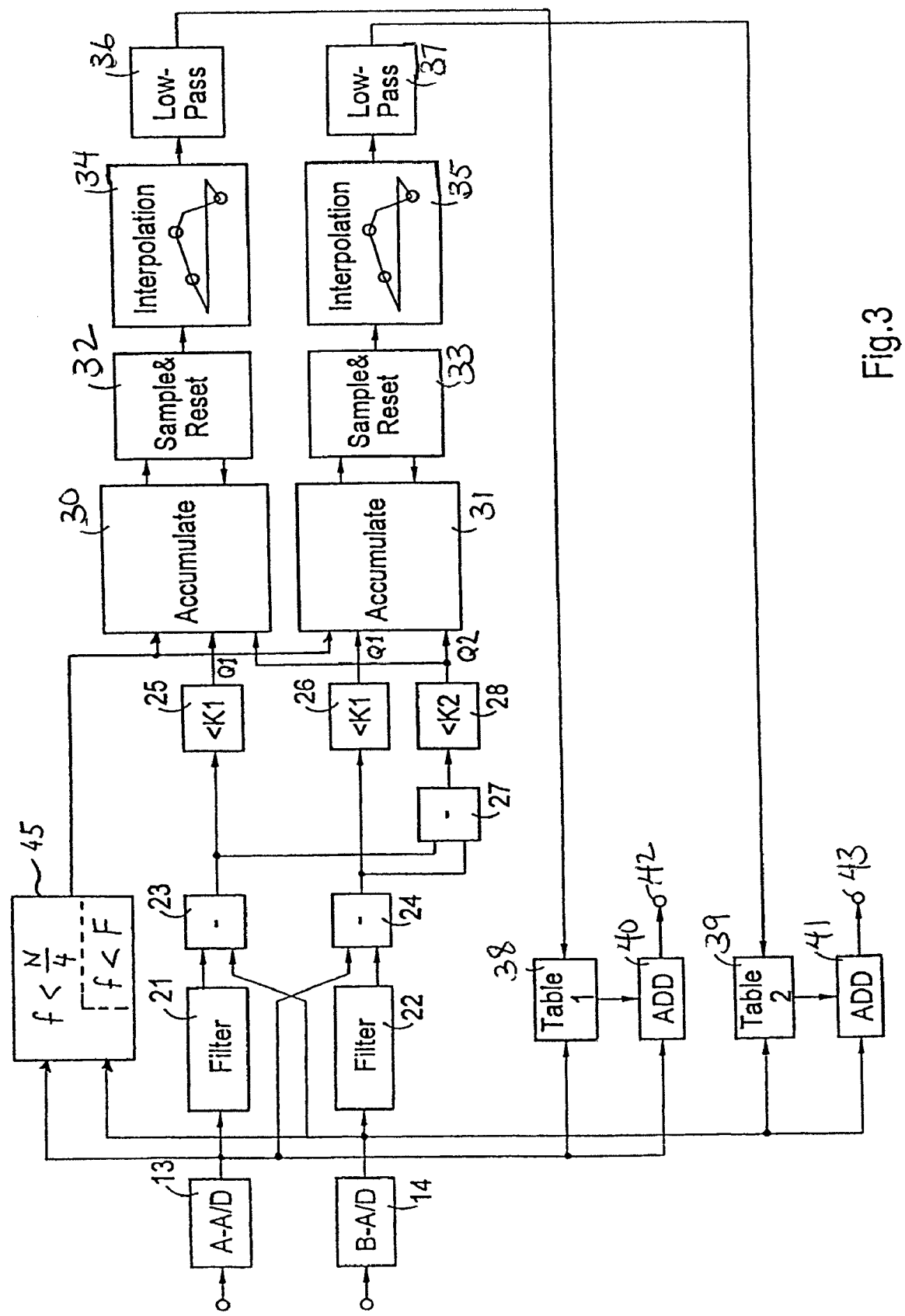
FIG. 3 shows a block diagram of an arrangement according to the invention.

At the outputs of the registers 4, 5, 6, 7 there are analogue amplifiers 8, 9, 10, 11, from the outputs of which the signals are fed to analogue/digital converters 13, 14 (FIG. 3). The boundary between semgnets 2, 3 is shown by a separating line 12.

The transfer characteristics of the channels A, B, C, D differ from one another due to manufacturing tolerances. These differences may concern nonlinearities, different gain factors or offsets of the components used, in particular of the picture cells of the sensor.

Figure 2A:
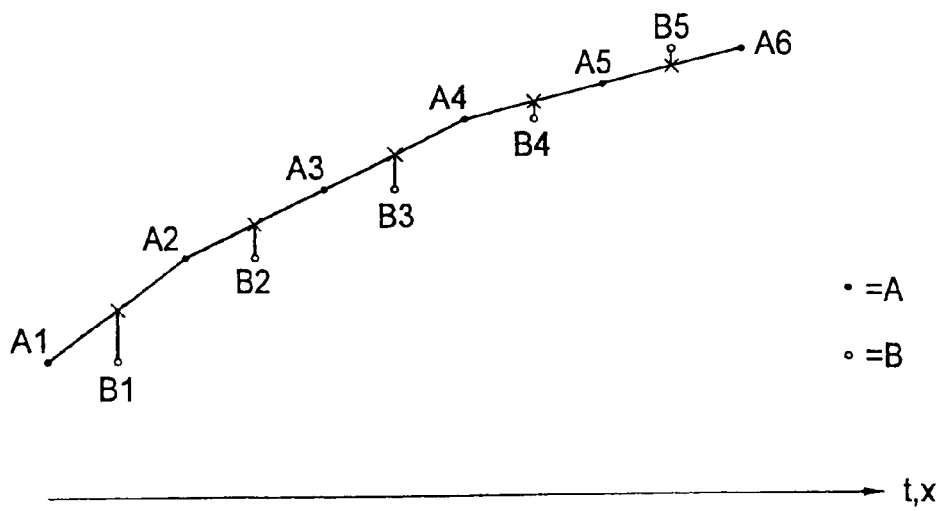
FIG. 2 shows a diagram with values of pixels of the two channels.
Figure 2B:
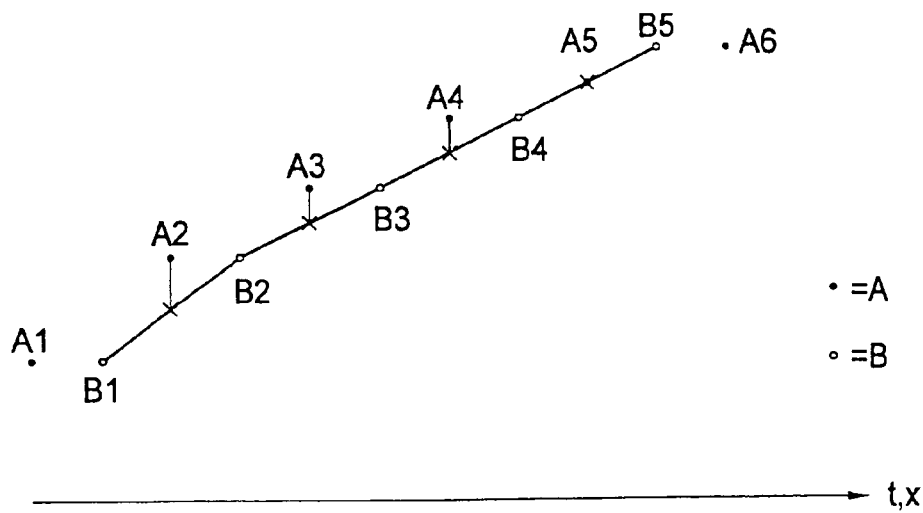

In FIGS. 2a and 2b, a plurality of values of the video signals from the two channels are in each case plotted against time t or the location x. As a result of the linear scanning, a particular time corresponds to a particular location. Values from the channel A are identified by black dots and designated by A1 to A6. Values from the channel B are symbolized by circles and bear the designations B1 to B5. As a result of the pixel-sequential read-out from the optoelectronic transducer, the channels are in each case offset by one pixel or one pixel duration.

In the case of the process illustrated in FIG. 2a, a suitable filter is used to obtain a respective estimated value by interpolation of adjacent values A1 and A6, which is identified by a cross. Differences result between the estimated values and the actual values B1 to B5 of the channel B, the further processing of which differences will be explained later in connection with FIG. 3.

FIG. 2b shows the interpolation between the values B1 to B5 of the channel B and the difference formation between the estimated values thus produced and the values A2 to A5 of the channel A.

The initially analogue signals of the channels A and B are fed to the arrangement according to FIG. 3. The signals are respectively passed via an analogue/digital converter 13, 14 to filters 21, 22, which each carry out the interpolation illustrated in FIGS. 2a and 2b. The subsequent formation of the differences takes place in subtractors 23, 24. The difference between the differences is formed in a further subtractor 27. This is because if the differences deviate from one another to an excessively great extent, then they are not used to form the correction values. To that end, a comparator 28 is provided, which generates an enable signal Q2 only if the difference is less than a predetermined value K2.

The differences themselves are also checked in a similar manner, namely in comparators 25, 26, which generate an enable signal Q1 only when the respective difference is less than a predetermined value K1.

Signal levels which are associated with the difference are defined as a necessary criterion and are used to determine a characteristic over the entire amplitude profile, which is level-dependent and provides an addition value and a multiplication factor. The amplitude profile may be linear or may be in discrete form, for example being subdivided into 100 zones.

A further filter 45 is provided in order to assess the signal frequency, and its input side is connected firstly to the output of the analogue converter 13, and secondly to the analogue/digital converter 14 for the channel B. The output side of the filter 45 is connected to inputs of the accumulators 30, 31, in which the determined differences are accumulated separately on the basis of amplitude zones when the enable signals Q1, Q2 are present. A high-pass filter component which is produced from the filter 45 forms one criterion for the assessment of the measurement results which are stored in the accumulators 30, 31. If the signal frequency is too high and its signal amplitude is too great, then no useful statement can be made about the amplitude profile, so that the measurement results are rejected. However, if the frequency f is below a cut-off frequency N/4 or F, and he amplitude of the signal is below a limit amplitude, then a factor for the usefulness of this measurement value is determined and is used in a subsequent averaging process to determine the extent to which the individual measurement result is included in the correction calculation. N represents the frequency at which the line-array sensor is read, so that N/4 represents the so-called Nyquist frequency. Depending on the evaluation parameters, in particular on the limit values K1 and K2, a lower cut-off frequency F may be provided for the filter 45. This option, which is not necessarily available, is shown by a dashed line in the filter 45 in FIG. 3. The signal frequency is investigated in the filter 45 for two reasons. Firstly, the Nyquist criterion must be satisfied, in order to avoid undersampling in one channel. Secondly, it is necessary to ensure that pixel values originate only from the value range to be evaluated, and are not distributed around it. If picture contents whose contents vary too quickly are evaluated, then this can lead to difficulties.

The values themselves—that is to say the output signals of the analogue/digital converters 13, 14—and also the differences are fed to accumulators 30, 31, which accumulate the differences separately according to amplitude ranges if the enable signals Q1, Q2 are present. A respective sample and reset circuit 32, 33 ensures that a sufficiently large number of values suitable for forming correction signals are accepted without the accumulators 30, 31 overflowing. These values are divided, at 34, 35, by the number of values respectively accumulated for an amplitude range, thereby producing average values. Correction curves are determined therefrom by interpolation and are smoothed in filters 36, 37.

The smoothed correction curves produced by the filters 36, 37 contain, for each digital sample, a correction value which is in each case written to a table, which tables are stored in memories 38, 39. Suitable memories 38, 39 are commercially available digital memory modules. Depending on the digital values of the video signals of the two channels the correction values are in each case read from the memories 38, 39 and fed via a respective adder 40, 41 to the video signals. The corrected video signals can then be taken from the outputs 42, 43.

The determined correction values are recorded over a lengthy time period, without being used immediately. When, and only when, a result which is stable within predetermined limits is obtained, the correction process is carried out in steps, in order to avoid rapid picture changes. This allows use to be made of the capability to monitor the effects of the correction process, and to determine whether the correction has the desired characteristics.

Although the description has always referred to CCD sensors, the invention may, however, also be used irrespective of the nature of the sensor. For example, the invention can also be used for CMOS sensors.

What is claimed is:

1. A method for the correction of video signals which, for each element of a transducer, are transmitted pixel by pixel as digital pixel values alternately via at least two channels having different transfer characteristics, where from the pixel values transmitted via a first of the channels, estimated values for each of the pixels of a second of the channels are formed by means of interpolation from the values of two linear adjacent pixels, and where correction values for the pixel values of the second channel are derived from differences between the estimated values and the pixel values of the second channel.

2. The method according to claim 1, where the correction values are only formed from those differences which are less than a predetermined value.

3. The method according to claim 1, where further estimated values are formed from pixel values which are transmitted by interpolation by means of the second channel, where further differences are formed from the further estimated values and the pixel values of the first channel, where an average value is in each case formed from the differences and the further differences, and in that the correction values are derived from the average values.

4. The method according to claim 2, where further estimated values are formed from pixel values which are transmitted by interpolation by means of the second channel, where further differences are formed from the further estimated values and the pixel values of the first channel, where an average value is in each case formed from the differences and the further differences, and where the correction values are derived from the average values.

5. The method according to claim 3, where the differences and the further differences are in each case subtracted from one another, and where the respective average value of the differences is only used for correction if the value produced by subtraction of the difference and the further difference is less than a further predetermined value.

6. The method according to claim 4, where the differences and the further differences are in each case subtracted from one another, and where the respective average value of the differences is only used for correction if the value produced by subtraction of the difference and the further difference is less than a further predetermined value.

7. The method according to claim 1, where the differences and the further differences, for the purpose of forming the correction values, are averaged separately according to the magnitude of the pixel values, where the correction values are written to a memory, and where the correction values are read from the memory depending on the respective magnitude of the pixel values and are added to the pixel values of the first and/or the second channel.

8. The method according to claim 3, where the averaging is in each case effected separately according to the magnitude ranges of the pixel values, and where correction values are obtained for the individual pixel values by interpolation and low-pass filtering of the mean values within the various magnitude ranges.

9. The method according to claim 7, where the averaging is in each case effected separately according to magnitude ranges of the pixel values, and where the correction values are obtained for the individual pixel values by interpolation and low-pass filtering of the mean values within the various magnitude ranges.

10. The method according to claim 1, only pixel values which are evaluated are those which change at a rate which is below a cut-off frequency.

11. The method according to claim 1, where only pixel values which are evaluated are those which change at a rate which is below the Nyquist frequency.

12. The method according to claim 10, where the cut-off frequency depends on the predetermined value or on the further predetermined value.

* * * * *